(12) United States Patent
Srinivasan et al.

(10) Patent No.: US 7,734,114 B1
(45) Date of Patent: Jun. 8, 2010

(54) INTELLIGENT SATURATION OF VIDEO DATA

(75) Inventors: Sujith Srinivasan, Bangalore (IN); Nikhil Balram, Mountain View, CA (US)

(73) Assignee: Marvell International Ltd., Hamilton (BM)

(*) Notice: Subject to any disclaimer, the term of this patent is extended or adjusted under 35 U.S.C. 154(b) by 643 days.

(21) Appl. No.: 11/295,882

(22) Filed: Dec. 7, 2005

(51) Int. Cl.
*G06K 9/40* (2006.01)
*G06K 9/00* (2006.01)
*G03F 3/08* (2006.01)
*H04N 7/01* (2006.01)
*H04N 11/20* (2006.01)
*H04N 9/64* (2006.01)
*H04N 9/68* (2006.01)

(52) U.S. Cl. .............. 382/274; 382/162; 348/453; 348/256; 348/645; 358/520

(58) Field of Classification Search ............ None
See application file for complete search history.

(56) References Cited

U.S. PATENT DOCUMENTS

| | | | | |
|---|---|---|---|---|
| 4,727,412 A * | 2/1988 | Fearing et al. | ............... | 348/577 |
| 5,204,948 A * | 4/1993 | Kato | ............ | 358/520 |
| 5,283,858 A * | 2/1994 | Moellering et al. | ......... | 345/426 |
| 5,317,426 A * | 5/1994 | Hoshino | ............. | 358/515 |
| 5,317,678 A * | 5/1994 | Okawara et al. | ............. | 345/426 |
| 5,450,217 A * | 9/1995 | Eschbach et al. | ............ | 358/518 |
| 5,510,910 A * | 4/1996 | Bockman et al. | ............ | 358/502 |
| 5,850,471 A * | 12/1998 | Brett | ............ | 382/162 |
| 5,937,089 A * | 8/1999 | Kobayashi | ............... | 382/167 |
| 5,982,926 A * | 11/1999 | Kuo et al. | ............... | 382/167 |
| 6,049,859 A * | 4/2000 | Gliese et al. | ................ | 712/17 |
| 6,321,248 B1 * | 11/2001 | Bonnet et al. | ............... | 708/552 |
| 6,664,973 B1 * | 12/2003 | Iwamoto et al. | ............ | 345/589 |
| 6,816,610 B1 * | 11/2004 | Beckwith | .................... | 382/162 |
| 6,823,083 B1 * | 11/2004 | Watanabe et al. | ........... | 382/167 |
| 6,917,444 B1 * | 7/2005 | Moriwaki | ................... | 358/1.9 |
| 6,954,287 B1 * | 10/2005 | Balasubramanian et al. | . | 358/1.9 |
| 7,436,996 B2 * | 10/2008 | Ben-Chorin et al. | ........ | 382/167 |
| 7,453,591 B2 * | 11/2008 | Yao | ........................... | 358/1.15 |
| 7,595,920 B2 * | 9/2009 | Kondo et al. | ................ | 358/518 |
| 2001/0016064 A1 * | 8/2001 | Tsuruoka et al. | ............ | 382/167 |
| 2002/0041709 A1 * | 4/2002 | Gonsalves | ................... | 382/167 |
| 2002/0145745 A1 * | 10/2002 | Kanno | ........................ | 358/1.9 |
| 2003/0053708 A1 * | 3/2003 | Kryukov et al. | ............. | 382/261 |

(Continued)

OTHER PUBLICATIONS

"Illustrated Computer Graphics Dictionary", Donald D. Spencer, Ph.D., Camelot Publishing, 1993: p. 236.*

*Primary Examiner*—Vikkram Bali
*Assistant Examiner*—Michelle Entezari

(57) ABSTRACT

The intelligent saturation controller calculates the exact maximum saturation any valid YCbCr pixel can undergo before it becomes invalid in RGB space. The controller models the saturation operation in RGB color space and calculates the maximum saturation level at which the RGB values falls outside the valid range. The saturation operation is performed independently for every pixel of the incoming video frame and ensures that each output pixel is a valid. The controller finds the maximum saturation for each input pixel and checks whether it is less than the input saturation factor. If so, then this calculated maximum saturation value is applied. If not, the input saturation factor is applied. Accordingly, the output RGB pixels are valid and no clamping is necessary if no other video processing is done in YCbCr space. Increasing the saturation of the video signal results in a more vivid and more colorful picture.

30 Claims, 6 Drawing Sheets

U.S. PATENT DOCUMENTS

| | | | |
|---|---|---|---|
| 2004/0013298 A1* | 1/2004 | Choe et al. | 382/167 |
| 2004/0136604 A1* | 7/2004 | Kuwata et al. | 382/254 |
| 2004/0184670 A1* | 9/2004 | Jarman et al. | 382/274 |
| 2004/0239971 A1* | 12/2004 | Kim | 358/1.9 |
| 2005/0007497 A1* | 1/2005 | Huang et al. | 348/645 |
| 2005/0099546 A1* | 5/2005 | Zhu | 348/645 |
| 2005/0219574 A1* | 10/2005 | Ok et al. | 358/1.9 |
| 2005/0236484 A1* | 10/2005 | Taylor | 235/462.04 |
| 2006/0045373 A1* | 3/2006 | Kurumisawa et al. | 382/254 |
| 2006/0092174 A1* | 5/2006 | Lin | 345/604 |
| 2006/0215044 A1* | 9/2006 | Masuda et al. | 348/224.1 |
| 2006/0285768 A1* | 12/2006 | Chen | 382/274 |
| 2007/0058082 A1* | 3/2007 | Nieuwenhuizen | 348/645 |
| 2007/0109317 A1* | 5/2007 | Minakuchi et al. | 345/604 |

\* cited by examiner

INTELLIGENT SATURATION OF VIDEO DATA

FIELD OF THE INVENTION

The present invention relates generally to image and video processing, and more particularly to saturation of color in image signals.

BACKGROUND OF THE INVENTION

For video applications, the YCbCr format is typically used because it is the industry standard for video transmission and storage. The YCbCr format is also typically easier to convert to and from RGB than from HSV. The ease in conversion is important because the final display is usually configured to accept data in RGB format. Increasing the saturation of a video signal results in a more vivid, and hence a more colorful picture. However, increasing the saturation of a YCbCr pixel is a processing step that is very prone to generating blatantly invalid pixels which result in invalid RGB values (and potentially visually annoying artifacts).

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
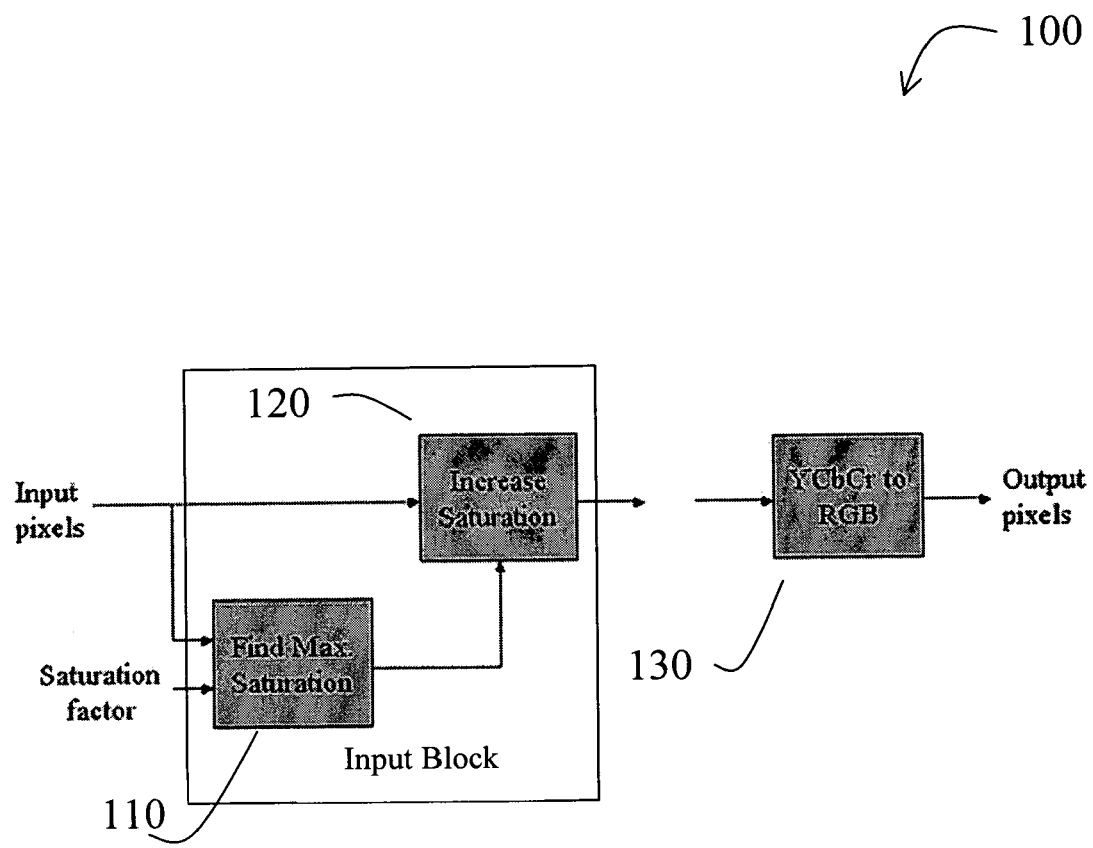
FIG. 1 is a block diagram of an example intelligent saturation controller for increasing saturation.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed to an intelligent saturation controller that calculates the exact maximum saturation any valid YCbCr (or more generally, any RGB) pixel can undergo before it becomes invalid in RGB space. The controller models the saturation operation in RGB color space and calculates the maximum saturation level at which the RGB values falls outside the valid range. The saturation operation is performed independently for every pixel of the incoming video frame and ensures that each output pixel is a valid. The intelligent saturation controller approach can be used at various stages of the video processing pipeline such as increase of video saturation for picture enhancement and correction of invalid pixels that arise due to other processing.

Various embodiments as discussed below can be incorporated into a video processing system such as described in U.S. patent application Ser. No. 11/296,185 filed Dec. 7, 2005, entitled "Color Management Unit," the disclosure of which is expressly incorporated herein by reference.

The intelligent saturation controller approach can be used in two directions to check RGB values to make sure they are remaining valid for any given saturation factor. First, intelligent saturation can be used to increase saturation to make images look more vivid, without causing side-effects of clipping or hue shifts. Secondly, intelligent saturation can be used as a gamut-remapping algorithm that decreases saturation to make the image fit within the given gamut.

The controller finds the maximum saturation for each input pixel and checks whether it is less than a predetermined saturation factor (e.g., an amount of saturation adjustment that is desired). If so, then this calculated maximum saturation value is applied. If not, the predetermined saturation factor is applied. Accordingly, the output RGB pixels are valid and no clamping is necessary if no other video processing is done in YCbCr space. Increasing the saturation of the video signal results in a more vivid and more colorful picture.

FIG. 1 is a block diagram of an example intelligent saturation controller for increasing saturation. The intelligent saturation controller (100) comprises a saturation evaluation unit (110) and a saturation processor (120). The example intelligent controller (100) calculates a maximum saturation for any YCbCr pixel that remains valid in RGB space. The calculation is accomplished by modeling the saturation operation in RGB color space and calculating the maximum saturation at which one of the RGB values falls outside the valid range.

The calculation (described below with reference to FIG. 5, for example) is typically performed independently for every pixel of the incoming video frame to ensure that each output pixel is valid in RGB space. The intelligent saturation controller finds the maximum saturation for each input pixel and verifies whether the input pixel is less than the predetermined saturation factor. If so, then this calculated maximum saturation value is applied. If not, the predetermined saturation factor is applied. In the proposed system, the output RGB pixels are guaranteed to be valid and no clamping is necessary if no other video processing is done in YCbCr space (this can be ensured by placing the color management unit at the back-end of the video processing pipeline.) Converter 130 converts YCbCr pixels to RGB pixels.

Figure 2:
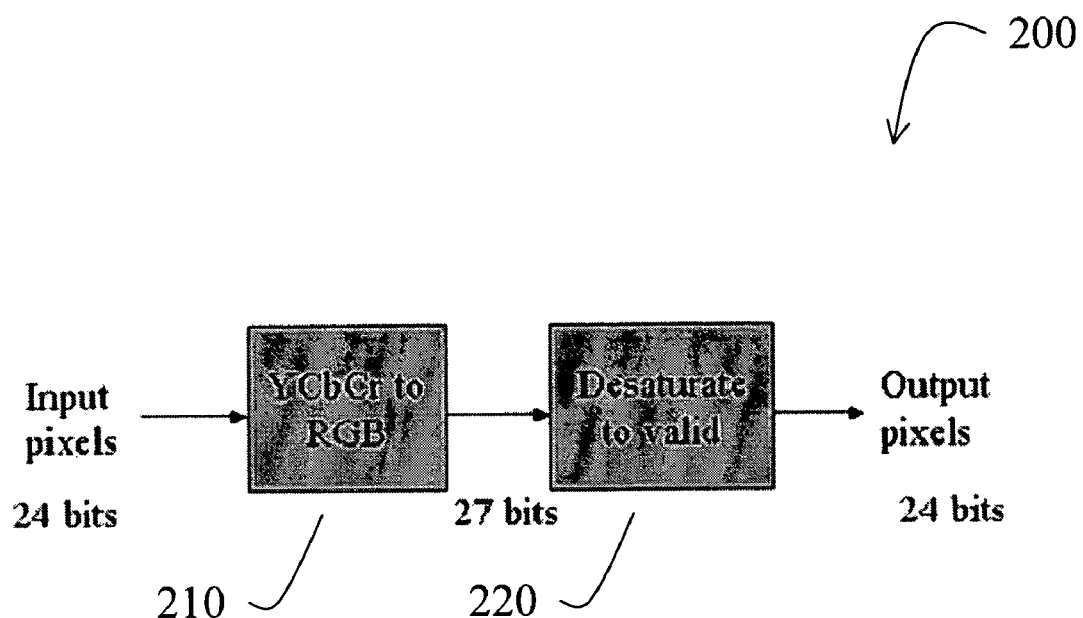
FIG. 2 is a block diagram of an example intelligent controller for decreasing saturation.

FIG. 2 is a block diagram of an example intelligent controller for decreasing saturation. The intelligent saturation controller (200) comprises a YCbCr-to-RGB converter (210) and a desaturation processor (220). In operation, the intelligent saturation controller can "correct" invalid pixels by desaturating the invalid pixels. To correct (rather than to merely clamp) invalid RGB pixels, the intelligent saturation controller calculates (described below with reference to FIG. 6, for example) the amount of desaturation needed to place invalid pixels within a valid range. In an embodiment, the desaturation is directly applied to RGB pixels instead of saturating pixels within YCbCr space. Valid pixels are typically unmodified. To represent the invalid pixels, the output data of the color space converter uses a higher resolution than the input. After the desaturation procedure, the original resolution is maintained.

Enhancement of video data is performed in all modern displays and video processing equipment. Video is usually transmitted and processed in YCbCr color space due to a number of reasons such as lower bandwidth and separation of brightness and color information. However, most display panels use RGB as their input data format. Because RGB input is commonly used as the input format, the YCbCr data is converted to RGB-formatted data at some stage of the video processing pipeline.

The conversion to RGB is done using a set of linear equations that calculate R, G and B given Y, Cb and Cr. The problem that arises during this conversion is that any valid YCbCr triplet (say 24 or 30 bits) does not always map to a valid RGB triplet (assuming the same number of bits). Processing and enhancement of YCbCr data may transform a valid YCbCr pixel into an invalid one (a valid YCbCr pixel is one that maps to a valid RGB pixel). Conventional conversion mechanisms typically clamp the invalid RGB values to the extremes of their valid range, which often leads to visual anomalies in the output signal. A disadvantage of clamping is that brightness and hue of the pixel are not preserved, and a loss of details and patchiness are present in the output picture.

The YCbCr color space is typically used for contrast enhancement because the luminance and color information are separate and can be processed independently. The YCbCr color space is also one of the common video exchange formats that is currently used. "Y" is the luminance (usually referred to as luma) of the video while "Cb" and "Cr" are the chroma or color components. Another advantage of transmitting signals in YCbCr format is that the bandwidth of the signal can also be reduced by down-sampling the chrominance signals. Down-sampling is visually acceptable because the human vision system is typically more sensitive to brightness than to color. Y, Cb and Cr are usually assigned values ranging from 0 to 255 in an 8-bit system.

When an offset of 128 is removed from Cb and Cr, the YCbCr space is referred to as the YUV space. In YUV space, U and V range from ±128 to 127. The value U is the offset removed representation of Cb and V is the offset removed representation of Cr. Although transmission of video data is often more convenient in YCbCr form (due to the unsigned nature of data), most color enhancement operations are usually defined in terms of the U and V components. For example, the location of the UV vector determines the hue of the color of a pixel. The three primary colors red, green and blue and their complementary colors yellow, magenta and cyan are spaced out circularly in the U-V plane with a separation of approximately 60°.

Data in RGB format can be converted to YUV using a set of linear equations such as:

$$\begin{pmatrix} Y \\ U \\ V \end{pmatrix} = \begin{bmatrix} 0.299 & 0.587 & 0.114 \\ -0.172 & -0.339 & 0.511 \\ 0.511 & -0.428 & -0.083 \end{bmatrix} \begin{pmatrix} R \\ G \\ B \end{pmatrix} \quad (1)$$

where R, G, B and Y range from 0 to 255 while U and V range from ±128 to 127. In the following example system, an 8-bit system is demonstrated.

The conversion coefficients in equation (1) are specified by the ITU-601 specification (SDTV) video standard. The inverse equation is used to convert YUV signals into an RGB format as follows:

$$\begin{pmatrix} R \\ G \\ B \end{pmatrix} = \begin{bmatrix} 1 & 0 & 1.371 \\ 1 & -0.698 & -0.336 \\ 1 & 1.732 & 0 \end{bmatrix} \begin{pmatrix} Y \\ U \\ V \end{pmatrix} \quad (2)$$

When an RGB pixel is converted to a YUV pixel, the valid signal space is compressed. Namely, while every valid n-bit RGB vector maps to a valid n-bit YUV vector, the converse is not true. This can be seen by inspection of the YUV to RGB transformation equations (2). When Y, U and V are all at their maximum values for example (Y is 255 and U and V are 127), the resulting R and B values exceed 255.

The compression of the valid pixel range is significant because if data for an input YUV pixel is valid, video enhancement of the pixel may change the pixel data to the point where the data may no longer be valid. The possibility of the pixel being transformed to an invalid space can substantially affect the quality of video processing algorithms that are usually performed on YUV data. Examples of such processing include deinterlacing, noise removal, sharpening, and color and contrast enhancements. Increasing the saturation of YUV data is particularly prone to generation of invalid data.

Figure 3:
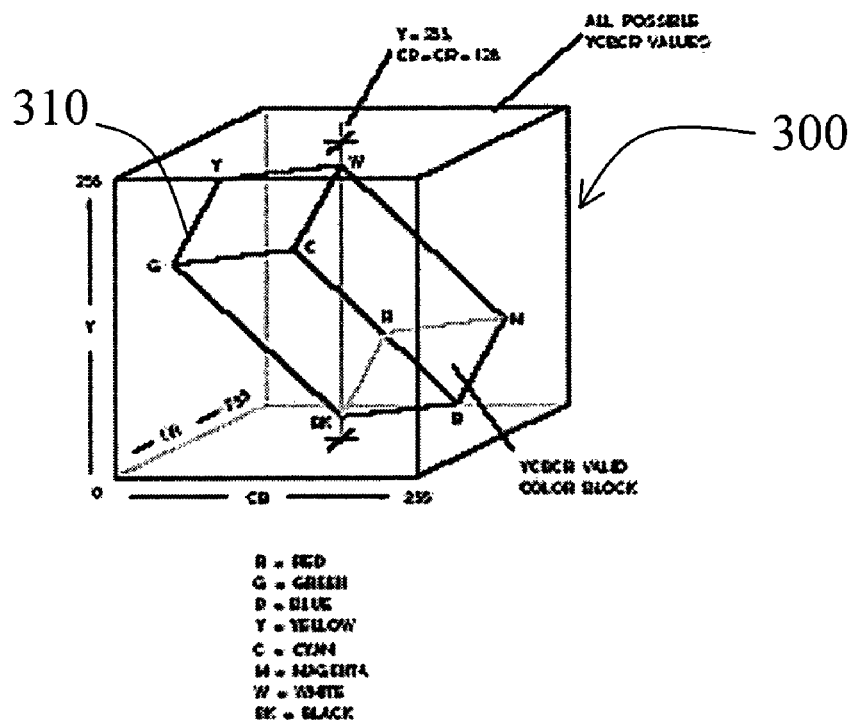
FIG. 3 is an example illustration of a valid space of YUV vectors in an 8-bit system.

FIG. 3 is an example illustration of a valid space of YUV vectors in an 8-bit system. The figure illustrates a valid space of YUV vectors is a cuboid shaped region (310) inside the cube of 8-bit YUV values (300). The figure shows that the identification of valid YUV data is relatively computationally intense. Prediction of when valid YUV vectors become invalid can be even more complex.

Enhancing the color of an incoming video data stream is one of the most commonly used enhancement procedures in consumer electronics. This can be done by increasing the saturation of the video data using the following equation:

$$\begin{pmatrix} U_{out} \\ V_{out} \end{pmatrix} = \begin{bmatrix} sat & 0 \\ 0 & sat \end{bmatrix} \begin{pmatrix} U_{in} \\ V_{in} \end{pmatrix} \quad (3)$$

Increasing the saturation is relatively simple—the input U and V values are multiplied by some saturation factor sat.

With respect to the U-V axis, changing the saturation can be visualized as moving the input $[u\ v]^t$ vector along a line through the origin and the original point. If sat is zero, the output point is $[0\ 0]^t$. An output point of $[0\ 0]^t$ corresponds to a black and white or gray level picture and having chroma components that are zero. If sat is greater than one, the input point is shifted away from the origin. In this case, the output point becomes more vivid or colorful than the original.

Because increase of saturation changes the chroma components significantly, the output chroma point is susceptible to falling outside the valid YUV cuboid.

To increase the saturation of YUV vectors while keeping them valid, it is instructive to study the effect of saturation increase in the RGB color space. Using the color space conversion and saturation equations presented above, the effect of video saturation on RGB color points can be translated using equation (4):

$$R_{out0} = satx(R_{in}-Y)+Y$$

$$G_{out} = satx(G_{in}-Y)+Y$$

$$B_{out} = satx(B_{in}-Y)+Y \qquad (4)$$

Equation (4) can be derived as follows:

$$\begin{aligned} R_{out} &= Y + 1.371V_{out} & \text{using Equation (2)} \\ &= Y + 1.371 sat V_{in} & \text{using Equation (3)} \\ &= Y + 1.371 sat(0.511R_{in} - 0.428G_{in} - 0.083B_{in}) & \text{using Equation (1)} \\ &= Y + sat(0.701R_{in} - 0.587G_{in} - 0.114B_{in}) \\ &= Y + sat(R_{in} - 0.299R_{in} - 0.587G_{in} - 0.114B_{in}) \\ R_{out} &= Y + sat(R_{in} - Y) & \text{using Equation (1)} \end{aligned}$$

While the equations are linear transformations of the RGB vector, there is still a dependence on the luminance Y.

Figure 4:
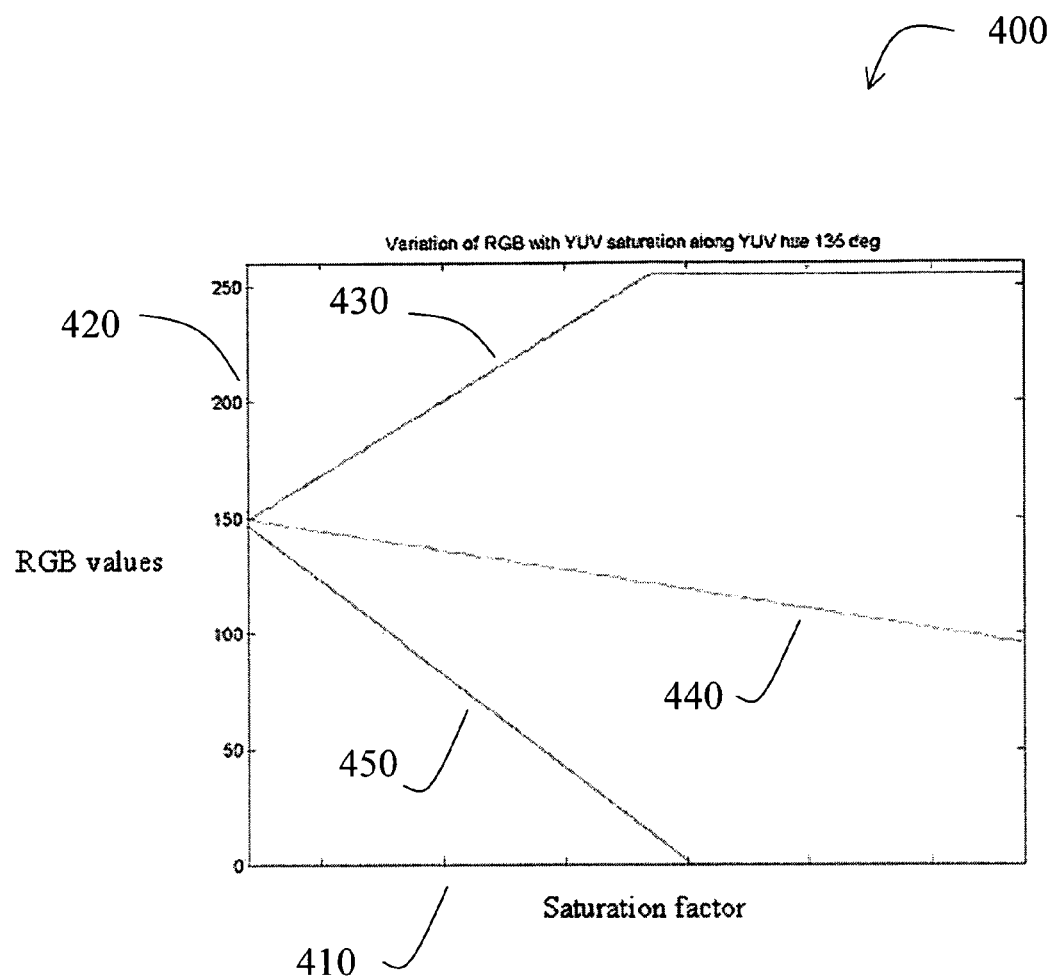
FIG. 4 is an example illustration of the effect of video saturation on an RGB color vector.

FIG. 4 is an example illustration of the effect of video saturation on an RGB color vector. The horizontal axis (410) represents the saturation factor, and the vertical axis (420) represents the RGB values. When sat is zero, the RGB values converge to the value of Y (approximately 150 in this example). As sat increases from 0, the RGB values vary in a straight-line fashion. The slopes of the red (430), green (440) and blue (450) lines depend on the hue of the color point, and (as just mentioned) the intersection of the red, green and blue lines with the y-axis depends on the luminance of the color point.

In the Figure, the x-axis of saturation factor is calibrated with the original RGB values of the color point plotted with respect to sat of 1, and the luminance value plotted with respect to sat of 0. Smooth lines are drawn from the luminance value through each of the original R, G and B values to illustrate the three lines that represent the variation of red, green and blue values respectively.

From FIG. 4, it can be seen that if the saturation is increased arbitrarily, then one or more of the red, green and blue lines approach 0 or 255. The hue of the color determines the slopes of these lines and thus determines which line would reach 0 or 255 first. As long as the RGB values are within the 0-255 range the color point can be saturated further and appears more colorful and vivid. However, the saturation cannot be increased further beyond the point where one of the RGB lines hit 0 or 255. If saturation is increased further, the resulting RGB point is invalid.

In the example, the resulting RGB point occurs when the red line (430) reaches the value 255. Even though the blue (440) and green (450) lines continue to vary in a linear fashion, the red line remains at the value 255. As the saturation is increased further, the blue reaches the value of 0 and remains there (along with red at 255) as green continues to change. Accordingly, the saturation increase should be stopped as soon as one color reaches the boundary of its range.

If the saturation continues beyond the maximum saturation point, the resulting color point undergoes a change of brightness and hue. The resulting picture has artifacts such as unnatural change in colors, loss of details etc. The effect of saturating the equivalent YUV point can be visualized as a shift of the point beyond the boundaries of the valid YUV cuboid (310). Although finding the boundaries of the valid YUV cuboid is a computationally expensive task, the problem of restricting the saturation can be easier to implement in the RGB domain.

Figure 5:
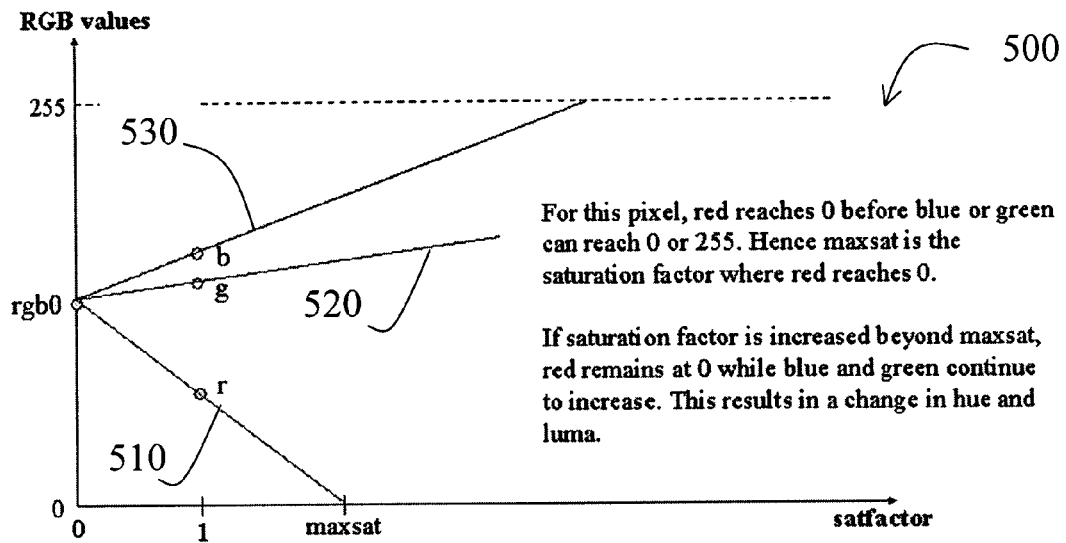
FIG. 5 is another example illustration of the effect of video saturation on an RGB color vector.

FIG. 5 is another example illustration of the effect of video saturation on an RGB color vector. The original RGB values r (510), g (520) and b (530) are given for a pixel, which correspond to a saturation increase of 1. The luma value y can be calculated using the color space conversion equations above. The calculated luma value corresponds to a sat of 0. The intelligent saturation controller determines the maximum saturation (maxsat) the pixel can undergo before one of r, g or b is invalid. In this case, maxsat is the saturation at which red becomes 0.

To determine the maximum saturation, the equations of two lines are examined: the line through y and the maximum of r, g and b, and the line through y and the minimum of r, g and b. The saturation ($sat_1$) at which the first line reaches 255, and the saturation ($sat_2$) at which the second line reaches the value 0 are calculated. The lesser of $sat_1$ and $sat_2$ is chosen to be maxsat.

Let $bgr_{max}$=max(b, g, r) and $bgr_{min}$=min(b, g, r). From analytical geometry:

$$sat_1 = \frac{255-y}{bgr_{max}-y} \text{ and } sat_2 = \frac{y}{y-bgr_{min}} \text{ such that} \qquad (5)$$

$$maxsat = \min(sat_1, sat_2) = \min\left(\frac{255-y}{bgr_{max}-y}, \frac{y}{y-bgr_{min}}\right) \qquad (6)$$

Using Equation (6), each frame of the incoming video signal can be saturated by calculating the maximum saturation of each pixel of the frame and constraining the amount of saturation applied such that it equals or falls below that maximum value. For example, if it is desired to saturate a picture by a factor of 2, each pixel of the frame is examined to see whether its individual maxsat is greater than two. If the maxsat of a particular pixel is greater than two, then this pixel can be saturated by two without any artifacts. If however, its maxsat is less than two, say 1.75, then this pixel is saturated by 1.75 only.

Thus each pixel may be saturated to a different extent depending on its maxsat value, which in turn depends on its RGB values. When the incoming pixels are YUV, they are first converted to RGB to determine their maximum saturation values. The actual increase of saturation can be done in either YUV or RGB domains using the equations presented earlier.

An example algorithm for intelligent saturation of video signals is:

For each incoming pixel do:
1. If the incoming pixel is YUV, find the corresponding RGB values. They correspond to sat of 1
2. If the incoming pixel is RGB, find its luminance. This is the RGB value for a sat of 0
3. Calculate $bgr_{max}$ and $bgr_{min}$
4. Use the above values to calculate $sat_1$, $sat_2$ and hence maxsat
5. Let insat be the input or desired saturation, and outsat be the output saturation value to be computed as a. If insat is less then or equal to maxsat, let outsat=insat
b. If insat is greater than maxsat, let outsat=maxsat
6. Calculate the output color point using either the RGB or YUV saturation equations with outsat as the saturation factor The example algorithm is relatively simple to implement in hardware. The division can be computed using an 8-bit deep lookup table. Notwithstanding the lookup table, no large memory elements are required.

Many digital video processing tasks are performed in the YCbCr domain since they are well defined in this color space. During the course of video processing, pixels that were valid RGB pixels may be shifted out of the valid YUV cuboid. Usually when these pixels are converted back to RGB, the RGB values are clamped to 0 and 255. A similar situation exists when RGB values are mapped to conform to different display devices that have different color gamuts using transformations such as those specified by the sRGB standard. In such situations, an input RGB point is often mapped to an output RGB point that falls outside the 0-255 range.

"Correcting" an invalid pixel by de-saturating the pixel until it falls within the 0-255 range ensures the output pixel value maintains the same brightness and hue as the transformed but invalid pixel. The method of de-saturation operates in accordance with the method of intelligently increasing the saturation as described above.

Figure 6:
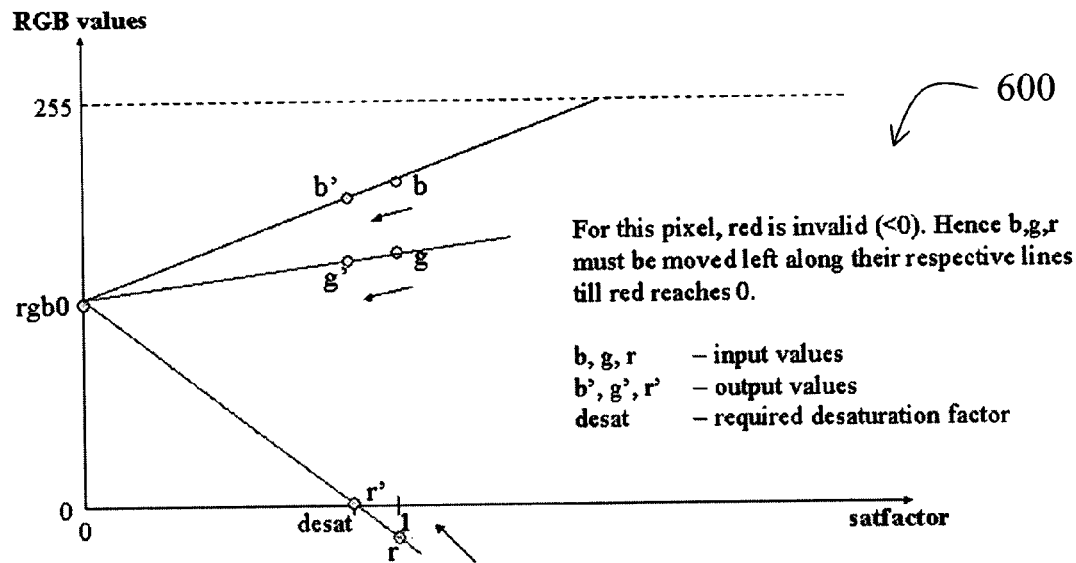
FIG. 6 shows an example of de-saturating an invalid pixel. The invalid pixel has one or more of its RGB values outside the 8-bit valid range.

FIG. 6 shows an example of de-saturating an invalid pixel. The invalid pixel has one or more of its RGB values outside the 8-bit valid range. Graph 600 shows that the value for r is less than 0. The invalid pixel corresponds to a sat of 1, while its luma value y corresponds to a sat of 0. The problem is to determine the value of de-saturation required, desat, that brings the pixel into valid range. The value of desat ranges from 0 to 1. The method to compute desat can use the same equations that were used to compute maxsat, as in Equation (6) above.

Once desat has been computed, the invalid pixel can be de-saturated using the saturation equations shown earlier. As with the computation of maxsat, desat must be computed on a pixel-by-pixel basis, obviously for invalid pixels only. But since the RGB values of an invalid pixel are outside the 0-255 range, the depth of the division LUT will now be greater than 8 bits and the size of the multipliers would now be increased.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Also, different bit depths can be used for the calculations as describe above. Although described embodiments are described as having a 0-255 range (since 8-bits per sub-pixel is the most common bit depth used for mainstream displays), other ranges can be used, including a 10 bit range (0-1023) or 12 bit range (0-4095) or any other bit depth. Additionally, subsets of ranges (such as 16-256) can be used as well. Since many embodiments of the invention can be made without departing from the spirit and scope of the invention, the invention resides in the claims hereinafter appended.

We claim:

1. A method for processing an input pixel of an image frame, the method comprising:
   receiving an input pixel having hue, saturation, and luminance information;
   determining a luminance value and a saturation value of the input pixel;
   calculating a maximum saturation value based on a color component value of the input pixel at which all color component values of the input pixel are within a valid color component range, wherein the maximum saturation value is a minimum of (1) a first saturation value based on a minimum color component value of the input pixel and the luminance value, and (2) a second saturation value based on a maximum color component value of the input pixel and the luminance value;
   adjusting the determined saturation value to the maximum saturation value such that the hue and luminance of the input pixel is preserved; and
   providing an output pixel having the adjusted saturation value.

2. The method of claim 1, further comprising comparing the determined saturation value with a predetermined saturation value and adjusting the determined saturation value in response to the comparison.

3. The method of claim 1, wherein the determined saturation value is increased to the maximum saturation value.

4. The method of claim 3, wherein the input pixel is converted from a YUV pixel to an RGB pixel before increasing the determined saturation value.

5. The method of claim 1, wherein the determined saturation value is decreased to the maximum saturation value.

6. The method of claim 5, wherein the determined saturation value is decreased in RGB space.

7. The method of claim 1, wherein the determined saturation value is decreased in YUV space.

8. The method of claim 1, wherein the maximum saturation value is found in according with the equation:

$$\text{maxsat} = \min(sat1, sat2) = \min\left(\frac{255-y}{bgr_{max}-y}, \frac{y}{y-bgr_{min}}\right).$$

9. A system for processing an input pixel of an image frame, the system comprising:
   a saturation evaluation unit that is configured to:
      receive an input pixel having hue, saturation, and luminance information; and
      determine a luminance value and a saturation value of the input pixel; and
   a saturation processor that is configured to:
      calculate a maximum saturation value based on a color component value of the input pixel at which all color component values of the input pixel are within a valid color component range, wherein the maximum saturation value is a minimum of (1) a first saturation value based on a minimum color component value of the input pixel and the luminance value, and (2) a second saturation value based on a maximum color component value of the input pixel and the luminance value;
      adjust the determined saturation value to the maximum saturation value such that the hue and luminance of the input pixel is preserved; and
      provide an output pixel having the adjusted saturation value.

10. The system of claim 9, wherein the saturation processor is further configured to compare the determined saturation value with a predetermined saturation value and adjust the determined saturation value in response to the comparison.

11. The system of claim 9, wherein the determined saturation value is increased to the maximum saturation value.

12. The system of claim 11, wherein the input pixel is converted from a YUV pixel to an RGB pixel before increasing the determined saturation value.

13. The system of claim 9, wherein the determined saturation value is decreased to the maximum saturation value.

14. The system of claim 13, wherein the determined saturation value is decreased in RGB space.

15. The system of claim 9, wherein the determined saturation value is decreased in YUV space.

16. The system of claim 9, wherein the maximum saturation value is found in according with the equation:

$$\mathrm{maxsat} = \min(sat1, sat2) = \min\left(\frac{255-y}{bgr_{max}-y}, \frac{y}{y-bgr_{min}}\right).$$

17. A system for processing an input pixel of an image frame, the system comprising:
   means for receiving an input pixel having hue, saturation, and luminance information;
   means for determining a luminance value and a saturation value of the input pixel;
   means for calculating a maximum saturation value based on a color component value of the input pixel at which all color component values of the input pixel are within a valid color component range, wherein the maximum saturation value is a minimum of (1) a first saturation value based on a minimum color component value of the input pixel and the luminance value, and (2) a second saturation value based on a maximum color component value of the input pixel and the luminance value;
   means for adjusting the determined saturation value to the maximum saturation value such that the hue and luminance of the input pixel is preserved; and
   means for providing an output pixel having the adjusted saturation value.

18. The system of claim 17, further comprising means for comparing the determined saturation value with a predetermined saturation value and means for adjusting the determined saturation value in response to the comparison.

19. The system of claim 17, wherein the determined saturation value is increased to the maximum saturation value.

20. The system of claim 17, wherein the determined saturation value is decreased to the maximum saturation value.

21. The method of claim 1, wherein the maximum saturation value comprises a saturation value corresponding to a maximum color component value of the input pixel.

22. The method of claim 1, wherein the maximum saturation value comprises a saturation value corresponding to a minimum color component value of the input pixel.

23. The method of claim 1, wherein the maximum saturation value corresponds to a linear relationship between the luminance value and one of the color component values of the input pixel.

24. The system of claim 9, wherein the maximum saturation value comprises a saturation value corresponding to a maximum color component value of the input pixel.

25. The system of claim 9, wherein the maximum saturation value comprises a saturation value corresponding to a minimum color component value of the input pixel.

26. The system of claim 9, wherein the maximum saturation value corresponds to a linear relationship between the luminance value and one of the color component values of the input pixel.

27. The method of claim 1, wherein the first saturation value is based on a difference between the minimum color component value of the input pixel and the luminance value, and
   the second saturation value is based on a difference between the maximum color component value of the input pixel and the luminance value.

28. The system of claim 9, wherein the first saturation value is based on a difference between the minimum color component value of the input pixel and the luminance value, and
   the second saturation value is based on a difference between the maximum color component value of the input pixel and the luminance value.

29. The system of claim 17, wherein the first saturation value is based on a difference between the minimum color component value of the input pixel and the luminance value, and
   the second saturation value is based on a difference between the maximum color component value of the input pixel and the luminance value.

30. The system of claim 17, wherein the maximum saturation value corresponds to a linear relationship between the luminance value and one of the color component values of the input pixel.

* * * * *